US006352123B1

(12) United States Patent
Schlegel et al.

(10) Patent No.: US 6,352,123 B1
(45) Date of Patent: Mar. 5, 2002

(54) VEHICLE HITCH LINK

(75) Inventors: Daniel K. Schlegel, Salem, WI (US); Michael D. Morton, Newport Richey, FL (US); Theodore M. Clarke, Western Springs, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/364,937

(22) Filed: Jul. 30, 1999

(51) Int. Cl.⁷ .............................................. A01B 59/043
(52) U.S. Cl. ....................................................... 172/439
(58) Field of Search ................................ 172/439, 272; 280/415.1; 148/572, 906

(56) References Cited

U.S. PATENT DOCUMENTS

| | | | |
|---|---|---|---|
| 3,151,882 A | * 10/1964 | Foxwell et al. | 172/439 |
| 3,394,948 A | * 7/1968 | Rugen et al. | 172/439 |
| 3,583,494 A | * 6/1971 | Thompson | 172/439 |
| 3,708,017 A | * 1/1973 | Alexandrovsky et al. | 172/439 |
| 3,876,232 A | * 4/1975 | Pertusi | 172/439 |
| 3,941,495 A | * 3/1976 | Duncan | 403/267 |
| 4,087,188 A | * 5/1978 | McEowen | 403/138 |
| 4,466,631 A | * 8/1984 | Berg | 280/415 |
| 5,246,510 A | * 9/1993 | Kovacs et al. | 148/612 |
| 5,361,850 A | * 11/1994 | Muller et al. | 172/439 |
| 5,551,998 A | 9/1996 | Crafton et al. | |
| 5,601,146 A | 2/1997 | Schlegel et al. | |
| 5,705,266 A | 1/1998 | Keelan et al. | |
| 5,725,041 A | 3/1998 | Schultz | |
| 5,732,761 A | 3/1998 | Shimizu et al. | |
| 5,837,069 A | * 11/1998 | Deards et al. | 148/323 |

OTHER PUBLICATIONS

International Standard; *Agricultural wheeled tractors—Rear–mounted three point linkage.* Part 1: Categories 1, 2, 3 and 4, Third Edition Dec. 15, 1994.

Ford Farm Tractors and Equipment, AD–8020, AD 1081100, Ford Tractor Operations, Troy, Michigan.

Ford 4100 and 4600, Ford Tractors, AD–8698, Ford Motor Company, Troy, Michigan.

Ford 4100 and 4600, Ford Tractor Operations for Ford Motor Company, Jun. 1977.

Ford 3000, Ford Traktoren Landmaschinen.

Linkage Products, Tuthill Corporation, J.J. Tourek Division, Elk Grove Village, Illinois.

* cited by examiner

*Primary Examiner*—Robert E. Pezzuto
*Assistant Examiner*—Nathan Mammen
(74) *Attorney, Agent, or Firm*—Foley & Lardner

(57) ABSTRACT

A link for a hitch of a work vehicle includes an elongate arm having a first end adapted for being coupled to the work vehicle and a second end adapted for being coupled to an implement. At least one of the first and second ends includes a socket. The draft link further includes a ball removably retained within the socket. In an exemplary embodiment, the ball has a first surface with a first hardness and the socket has a second surface facing the first surface and having a second hardness less than the first hardness. The second surface is preferably formed from a metal including an ausferrite matrix and graphite spheroids. The link is preferably formed by providing at least one mold member having a cavity defining the elongate arm having the first and second ends and at least a portion of a surface of the socket at the first end configured to engage the ball, depositing a molten material into the cavity, solidifying the molten material in the cavity and removing the at least one mold member from about the solidified material. The molten material preferably comprises a ductile iron which is austempered adjacent the socket such that the socket is provided with a surface including an ausferrite matrix and graphite spheroids.

27 Claims, 8 Drawing Sheets

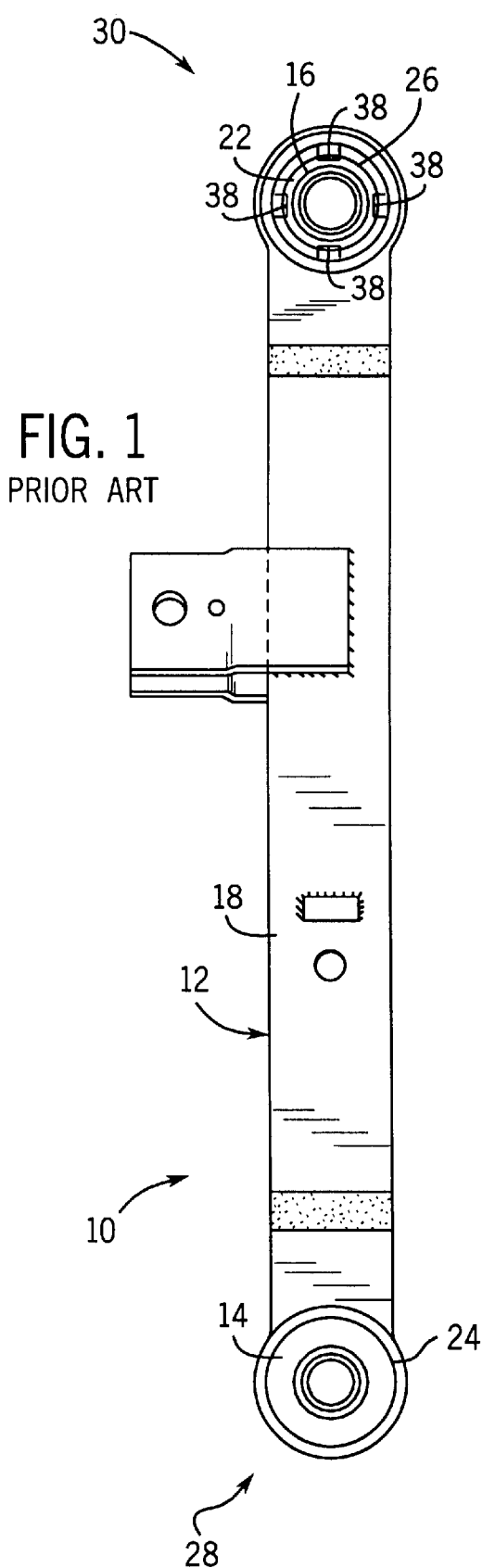
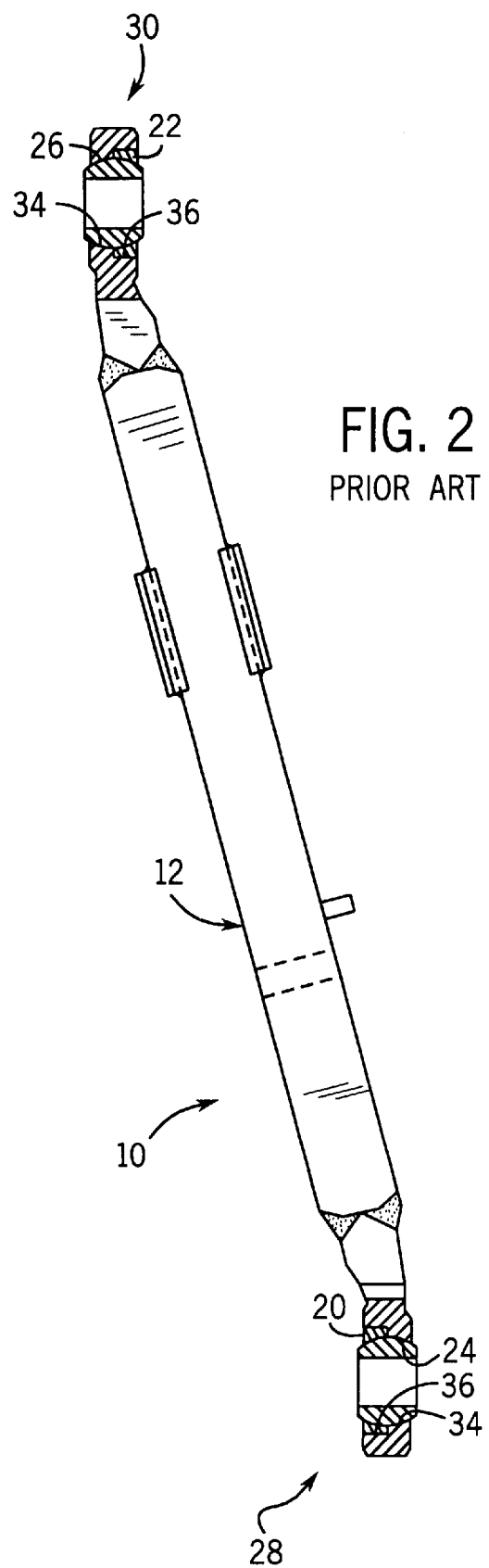
FIG. 1
PRIOR ART
FIG. 2
PRIOR ART

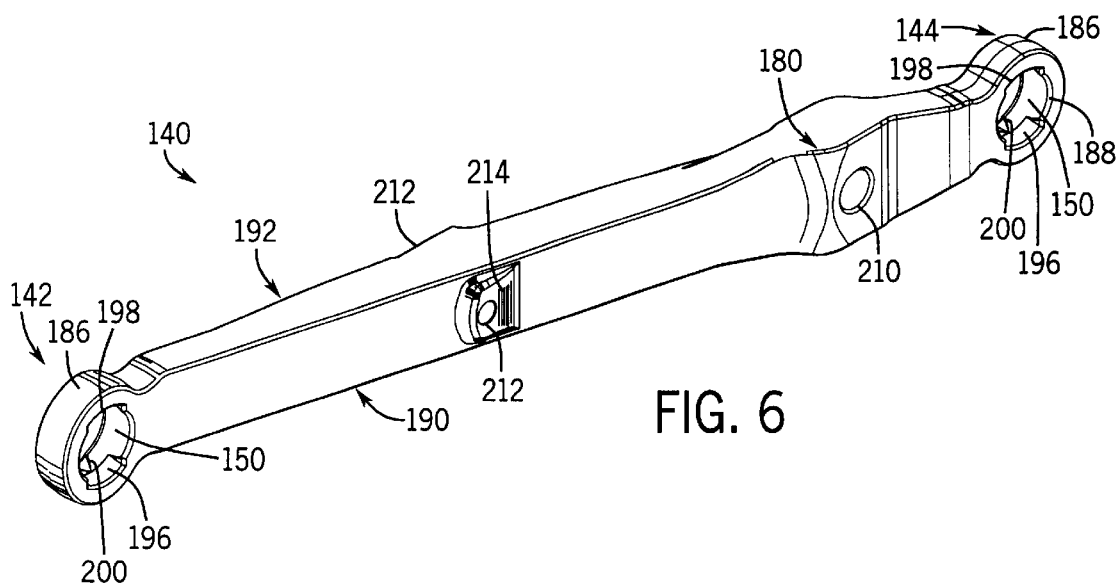
FIG. 6
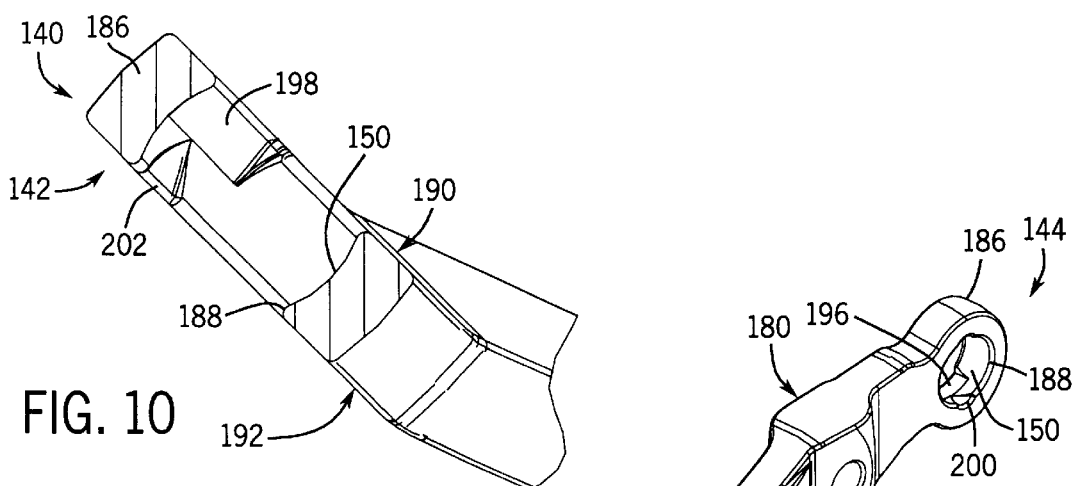
FIG. 10
FIG. 7

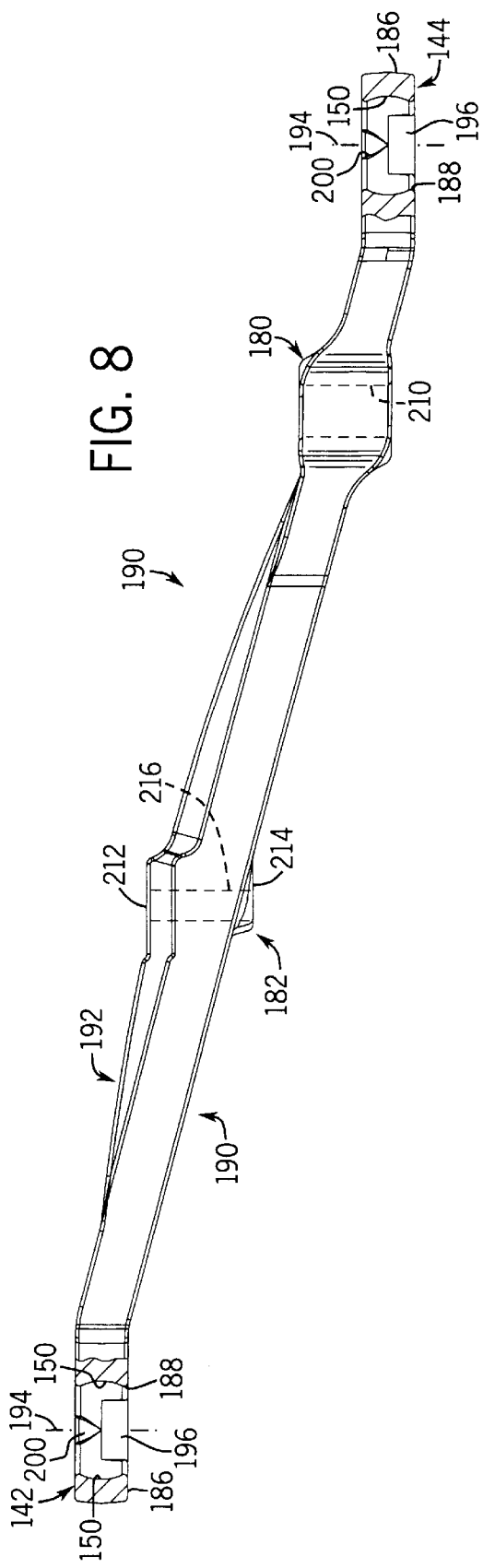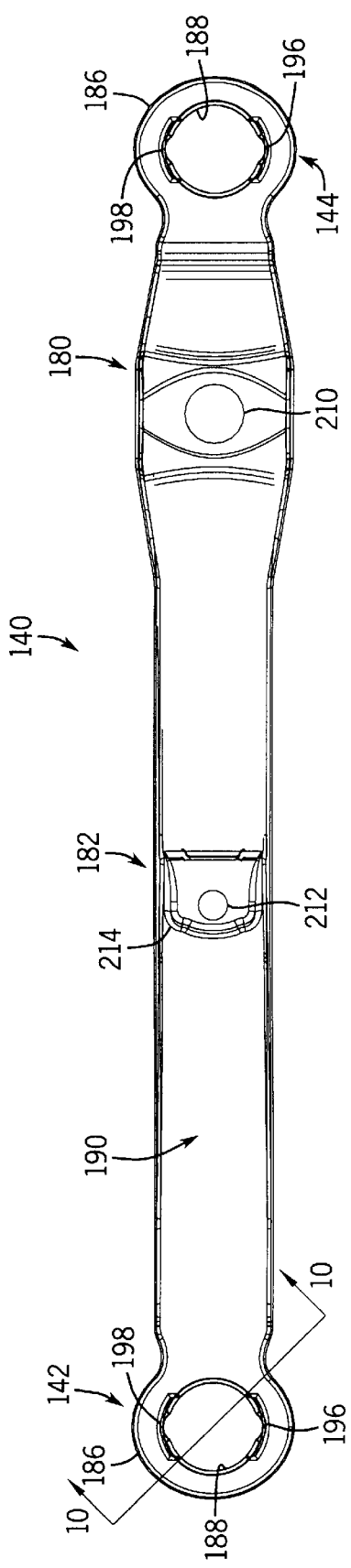

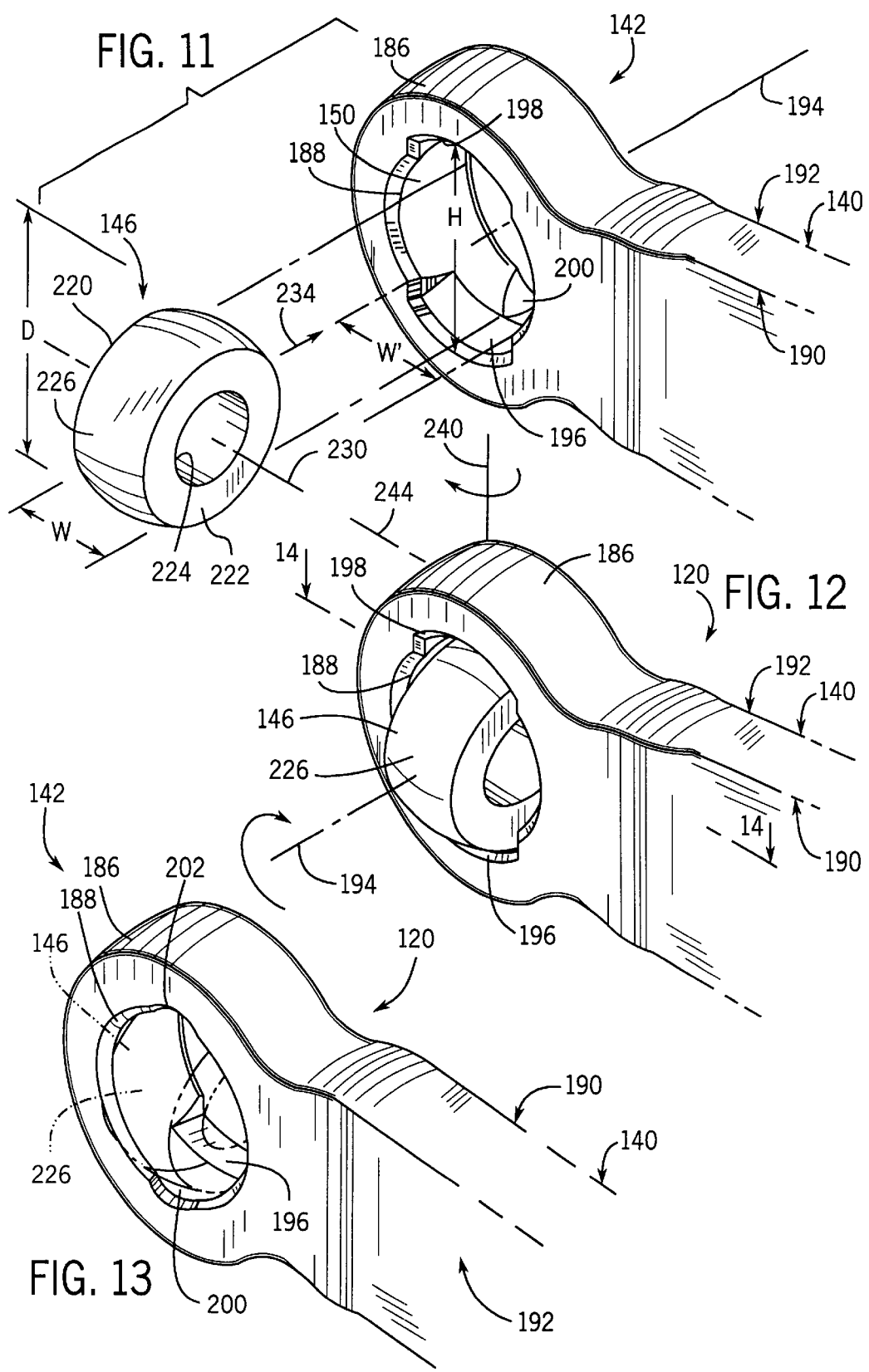

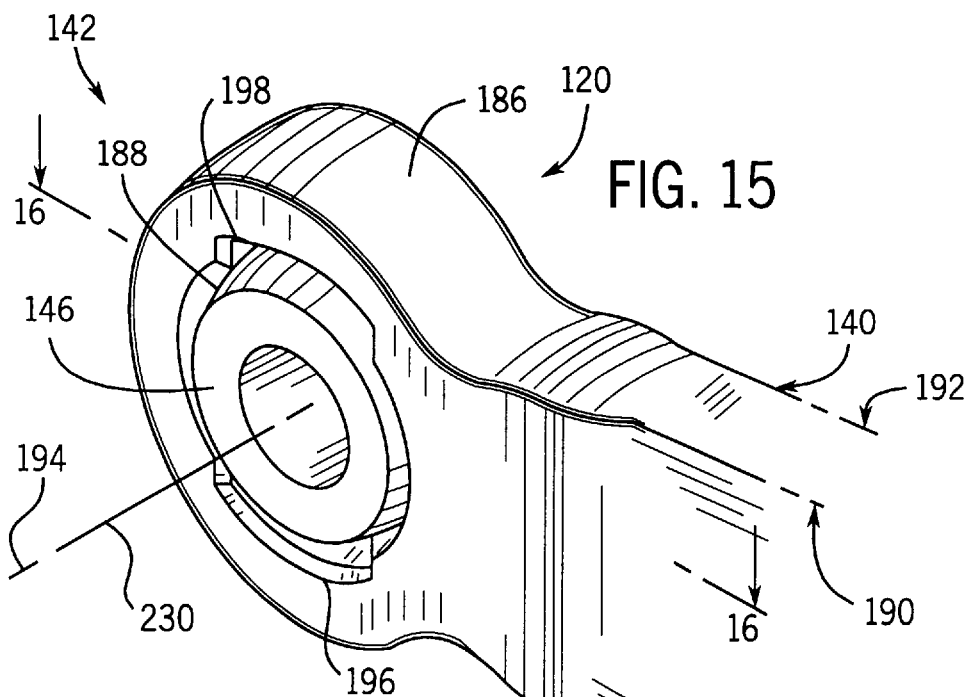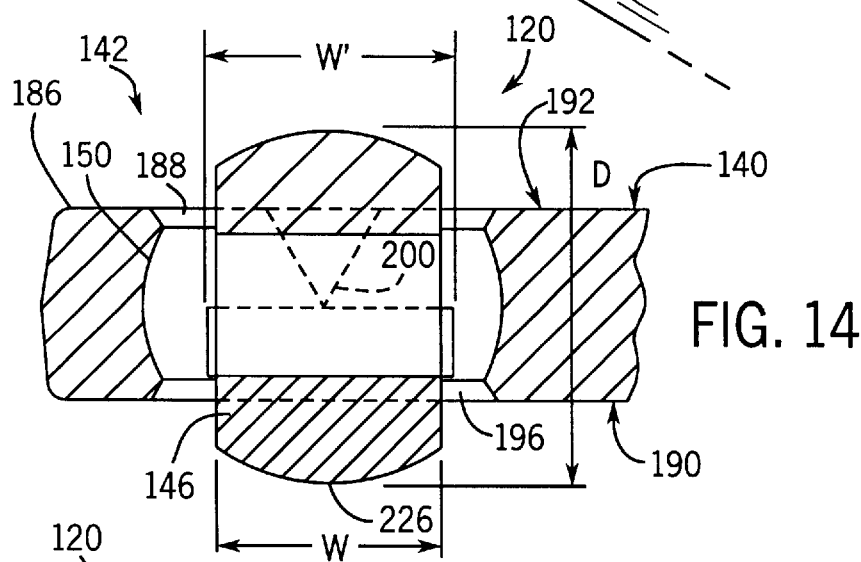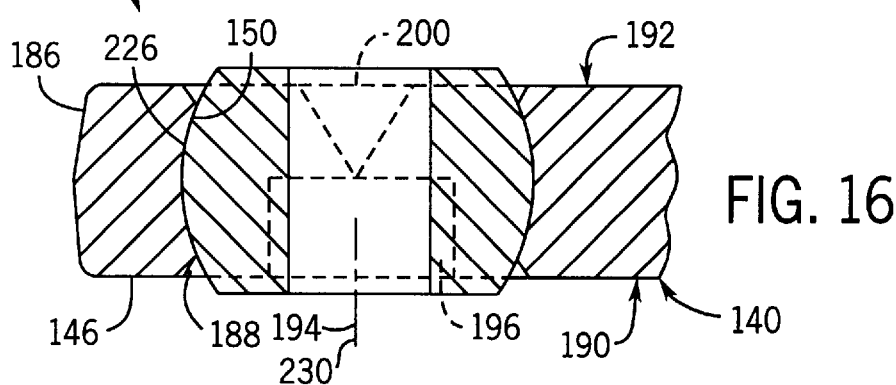

VEHICLE HITCH LINK

FIELD OF THE INVENTION

The present invention relates to work vehicle hitches. In particular, the present invention relates to upper and lower links of a work vehicle hitch and methods for manufacturing such links.

BACKGROUND OF THE INVENTION

Three-point hitches are employed at the rear or the front of work vehicles to lift, carry, pull and push implements or equipment attached to the work vehicle. Three-point hitches generally include linkages for attaching the equipment or implement to the work vehicle. Such linkages include an upper link and two lower links. Each link has an arm with a first end articulately connected to the work vehicle at a link point and a second end articulately connected to the implement at a hitch point.

To provide for articulation at the link point and the hitch point, the first and second ends each include a ball and socket joint formed by a bushing ball captured within a socket of the arm. The ball includes an opening therethrough which receives an attachment pin connected to the work vehicle at the link point or the implement at the hitch point.

FIGS. 1 and 2 illustrate a conventional lower or draft link 10 formed by conventional processes. As shown by FIGS. 1 and 2, link 10 includes a three-piece arm 12 and bushing balls 14, 16. Arm 12 includes member 18 and insert rings 20, 22. Member 18 is formed from wrought or forged medium carbon alloy steel which is machined to form semi-spherical surfaces 34. Insert rings 20, 22 are formed from wrought or forged low carbon alloy steel which is machined to form semi-spherical surfaces 36. After being machined, rings 20, 22 are case hardened to approximately 57–65 Rockwell C. Member 18 is hardened to a lesser hardness of approximately 40 Rockwell C so as have adequate toughness to resist high tensile loads. Member 18 and insert rings 20, 22 are then joined to form sockets 24, 26 at ends 28, 30 of link 10. In particular, link 10 is formed by pressing surfaces 34, 36 together with one of balls 14, 16 captured therebetween. The ends of the member 18 are then deformed or swedged at 38 to permanently affix the insert rings 20, 22 to member 18.

Conventional wisdom teaches that the wear of bushing balls 14, 16 and arm 12 is caused by abrasive particles, such as dust, trapped between bushing balls 14, 16 and sockets 24, 26. As a result, both bushing balls 14, 16 and socket inserts 20, 22 are designed to be as hard as the abrasive particles to resist such abrasive wear. Consequently bushing balls 14, 16 are hardended to a hardness of approximately 57–65 Rockwell C and spherical surface 36 of insert rings 20, 22 is also hardened to approximately 57–65 Rockwell C.

Although such links and the above process used to manufacture such links have been employed for many years, such links are difficult and costly to manufacture, are structurally weak at the link and hitch points, and are costly to repair and replace. As described in detail above, forming each ball and socket joint requires multiple processes such as forging, machining, heat treating and swedging. Each process and step adds to the manufacturing cost. In addition, because each ball is merely retained in place by the swedges securing the insert ring to the end of the arm, and because the cross section of member 18 at ends 28, 30 is reduced to accommodate insert rings 20, 22 the socket joints at the link and hitch points are inherently structurally weak. Moreover, because the hardness of the ball and the insert ring are substantially the same, the contacting surfaces of the ball and the ring will wear at the same rate. Once either the ball or the socket formed by the ring at either the first end or the second end of the link sufficiently wear, the entire link must be replaced. Replacement of the entire link is inconvenient and costly.

Thus, there is a continuing need for upper and lower links which are easy and inexpensive to manufacture, which are strong at the link and hitch points and which are inexpensive to repair and refurbish when worn.

SUMMARY OF THE INVENTION

The present invention provides a link for a hitch of a work vehicle. The link includes at least one elongate arm having a first end adapted for being coupled to the work vehicle and a second end adapted for being coupled to an implement either directly, or indirectly via a quick coupler. At least one of the first and second ends includes a socket integrally formed as part of a single unitary body. The link further includes a ball removably retained within the socket. The socket includes at least one passage through which the ball is insertable into the socket and removable from the socket.

The present invention also provides a link for a hitch of a work vehicle. The link includes an elongate arm having a first end adapted for being coupled to the work vehicle and a second end adapted for being coupled to an implement. At least one of the first and second ends includes a socket and a ball received within the socket. The socket has a first surface formed from a metal having an auspherite matrix and graphite. The ball has a second surface facing the first surface. As a result, the metal of the first surface resists adhesive wear of the socket from contact with the ball.

The present invention also provides an arm for use with the ball having a first surface to form a link of a work vehicle hitch. The arm includes an elongate member having a first end adapted for being coupled to the work vehicle and a second end adapted for being coupled to an implement. At least one of the first and second ends includes a socket. The socket has a second surface adapted to face the first surface of the ball when the ball is received within the socket. The second surface is formed from a metal having an ausferrite matrix and dispersed graphite spheroids. The metal resists adhesive wear of the socket from contact with the ball.

The present invention also provides a method for forming a link for a hitch of a work vehicle. The method includes the steps of providing at least one mold member having a cavity defining an elongate arm having first and second ends and at least a portion of a socket surface at the first end configured to receive a ball, depositing a molten material into the cavity, solidifying the molten material in the cavity and removing the at least one mold member from about the solidified material.

BRIEF DESCRIPTION OF THE DRAWINGS

FIG. 1 is a side elevational view of a conventional draft link.

FIG. 2 is a top elevational view of the conventional draft link of FIG. 1 with portions shown in section.

FIG. 6 is a left side perspective view of a draft arm of the hitch assembly of FIG. 4.

FIG. 7 is a right side perspective view of the draft arm of FIG. 6.

FIG. 8 is a top elevational view of the draft arm of FIG. 7 with portions shown in section for purposes of illustration.

FIG. 9 is a left side elevational view of the draft arm of FIG. 8.

FIG. 10 is a sectional view of the draft arm of FIG. 9 taken along the lines 10—10.

FIG. 11 is a perspective view of the draft arm of FIGS. 6–10 and a bushing ball for removable insertion into the draft arm to form a draft link of the hitch assembly of FIG. 4.

FIG. 12 is a perspective view illustrating the bushing ball being inserted into the draft arm of FIG. 11.

FIG. 13 is a perspective view of the bushing ball shown in phantom inserted into the draft arm of FIG. 11.

FIG. 14 is a fragmentary sectional view of the bushing ball and the draft arm of FIG. 12 taken along lines 14—14.

FIG. 15 is a perspective view illustrating the bushing ball inserted into the draft arm and wroughtated into alignment with the draft arm.

FIG. 16 is a fragmentary sectional view of the bushing ball and the draft arm of FIG. 15 taken along lines 16—16.

DETAILED DESCRIPTION OF THE PREFERRED EMBODIMENTS

Figure 3:
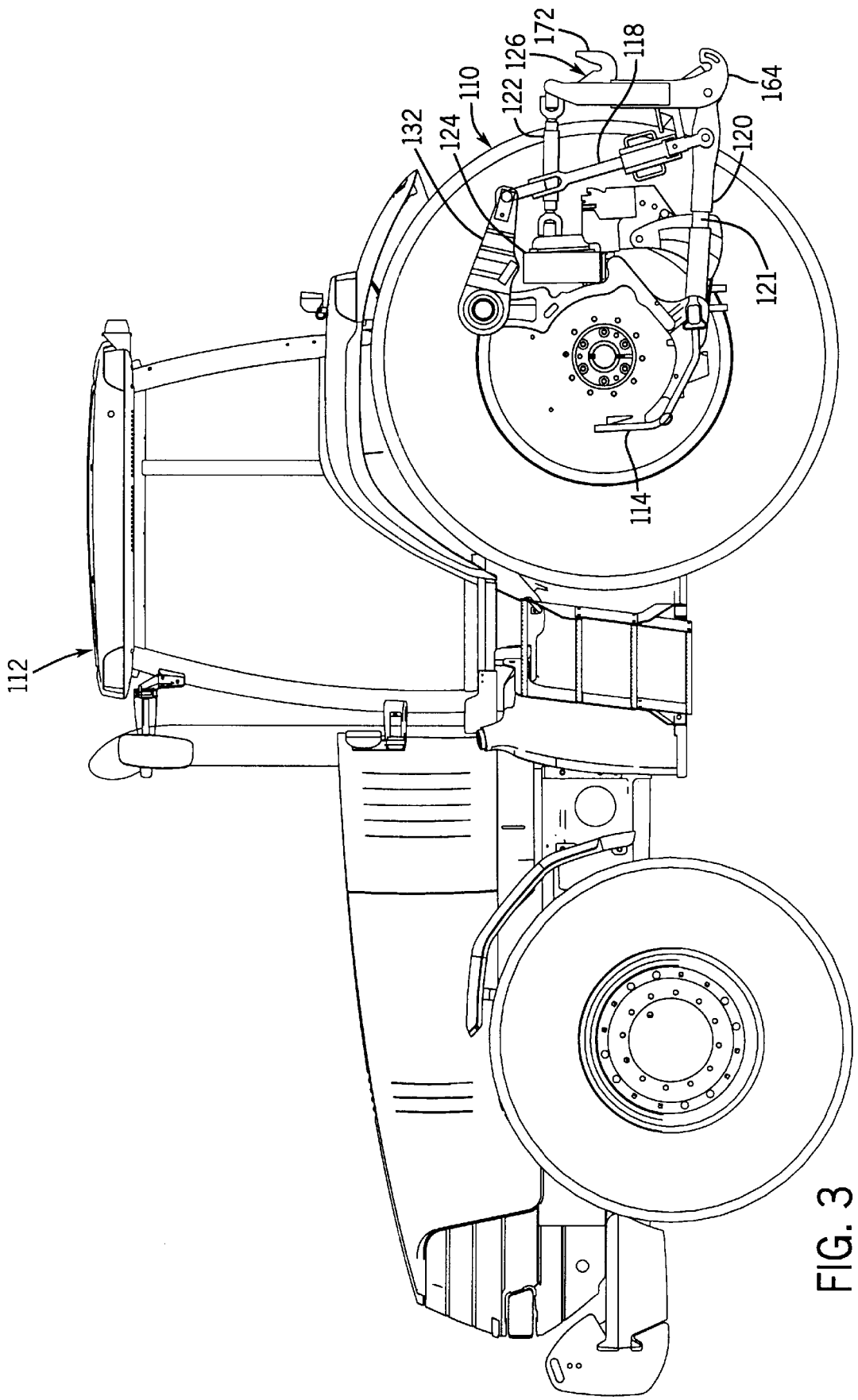
FIG. 3 is a fragmentary side elevational view of a work vehicle with portions removed to illustrate an exemplary embodiment of a hitch assembly of the present invention.
Figure 4:
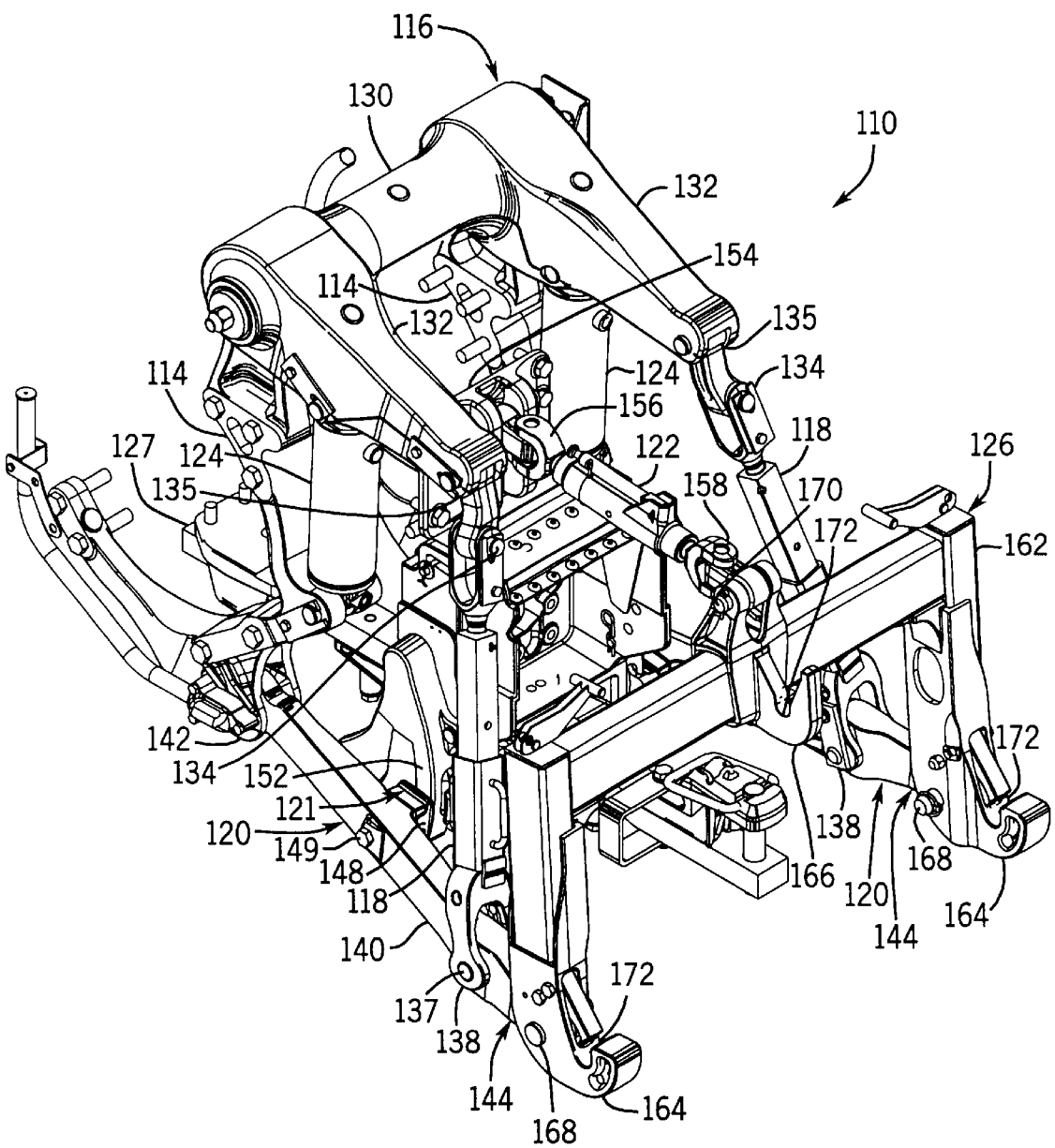
FIG. 4 is a perspective view of the hitch assembly of FIG. 3 detached from the work vehicle.
Figure 5:
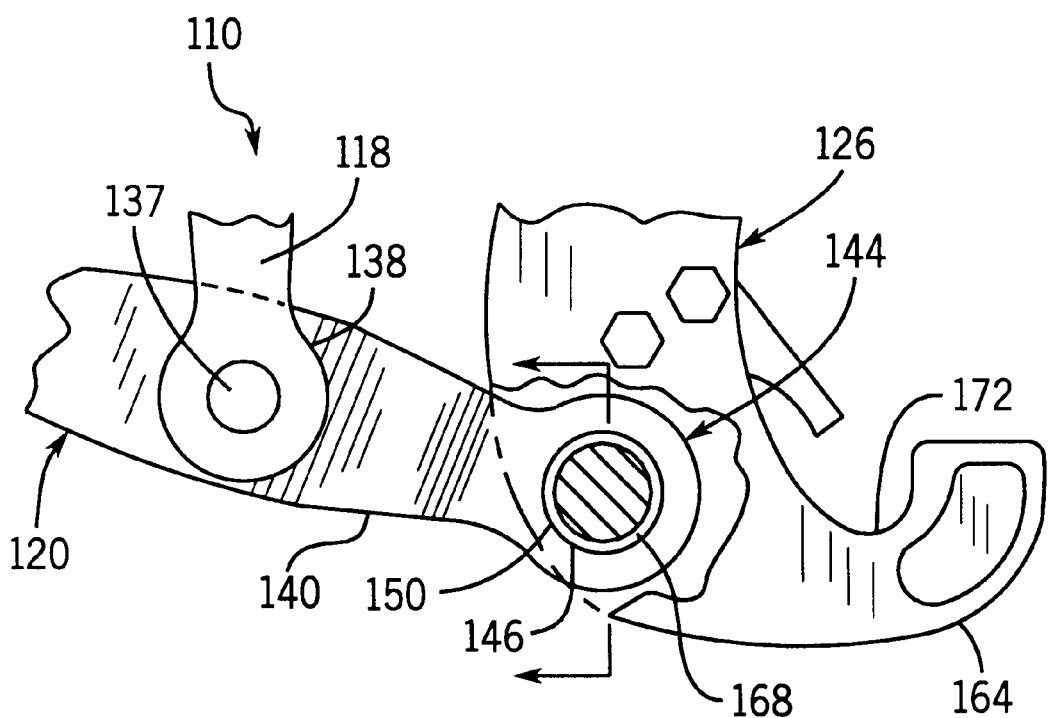
FIG. 5 is a greatly enlarged fragmentary side elevational view of the work vehicle of FIG. 1 with portions shown in section.

FIGS. 3–5 illustrate hitch assembly 110 of work vehicle 112. FIG. 3 is a fragmentary side elevational view of work vehicle 112 with portions removed to illustrate hitch assembly 110. FIG. 4 is a perspective view of hitch assembly 110 detached from work vehicle 112. FIG. 5 is a greatly enlarged fragmentary side elevational view of hitch assembly 110 with portions shown in section. Hitch assembly 110 generally includes brackets 114, rocker 116, lift links 118, lower or draft links 120, sway width adjusting apparatus 121, upper or center link 122 and actuators 124. Brackets 114, rocker 116, lift links 118 and actuators 124 of hitch assembly 110 are substantially similar to the corresponding elements illustrated and described in U.S. Pat. No. 5,601,146 entitled "Hitch Assembly for a Tractor" which issued Feb. 11, 1997 and which is presently assigned to Case Corporation, the full disclosure of which is hereby incorporated by reference. Brackets 114 facilitate the mounting of hitch assembly 110 on rear differential housing 127 of work vehicle 112. Alternatively, hitch assembly 110 may be supported on rear axial carriers (not shown), a structural frame or other structural elements of work vehicle 112. In addition, hitch assembly 110 may be further modified to be mounted and supported at a front of work vehicle 112.

Rocker 116 is mounted on and supported by brackets 114. Rocker 116 includes rock shaft 130 and rocker arms 132. Rock shaft 130 is pivotably supported between brackets 114 and supports rocker arms 132. Rocker arms 132 are pivotably connected to lift links 118 at joints 134 and 135. Lift links 118 extend from rocker arms 132 and are pivotably connected to draft links 120 at joints 138. Draft links 120 each include arm 140, having ends 142 and 144, and balls 146 (shown in FIG. 5) retained at ends 142 and 144. Arm 140 is generally an elongate member pivotally supported at end 142 relative to bracket 114 and pivotally coupled to hitch coupler 126 at end 144. To provide for freedom of movement in multiple directions, each of ends 142 and 144 includes a socket 150 (shown in FIG. 5) which wroughtatably receives ball 146.

Sway width adjusting apparatus 121 is illustrated and described in co-pending application Ser. No. 09/140,214 entitled "LIMITED SWAY CAM", filed on Aug. 26, 1998, the full disclosure of which is hereby incorporated by reference. Sway width adjusting apparatus 121 generally includes cam follower 148 and cam 152 on the left and right sides of work vehicle 112. Cam follower 148 is coupled to arm 140 between ends 142 and 144 and rides against cam 152 as link 120 is pivoted about end 142 to vary the degree to which links 120 may pivot sideways when lift links 120 are in either raised or lowered positions. Although cam follower 148 is illustrated as a distinct component mounted to arm 140, cam follower 148 may alternatively be integrally formed as part of a single unitary body with arm 140.

Upper link 122 extends above and between draft links 120 from mounting bracket 154 to hitch coupler 126. Upper link 122 preferably has an adjustable length and is pivotally connected to mounting bracket 154 at joint 156 and is pivotally connected to hitch coupler 126 at joint 158. Overall, draft links 120 and upper link 122 provide a linkage configured to articulately mount equipment or an implement to work vehicle 112.

Hitch coupler 126 comprises a device configured to facilitate connection of hitch assembly 110 to an implement. Hitch coupler 126 includes frame 162, claws 164, 166 and pins 168, 170. Frame 162 supports claws 164, 166 and is pivotally connected to draft links 120 and upper link 122 by pins 168 and 170, respectively. Pins 168 extend through balls 146 at ends 144 to pivotally support coupler 126 relative to draft links 120 in a multitude of directions. Pin 170 pivotally supports frame 162 to upper link 122 at joint 158. Claws 164 and 166 are configured to receive the lower hitch points and upper hitch points, respectively, of the equipment or implement. In particular, each of claws 164, 166 includes a semi-cylindrical support surface 172 configured to receive a pin, shaft or rod of the lower hitch points and the upper hitch point. As will be appreciated, hitch assembly 110 may omit coupler 126, whereby the pins, shafts or rods of the equipment or implement lower hitch points and upper hitch points are directly coupled to the ends of draft links 120 and upper link 122. In such an alternative arrangement, the rods, shafts or pins of the lower hitch points and upper hitch point of the equipment or implement function similarly to pins 168 and 170.

Actuators 124 pivot rocker 116 on brackets 114 to pivotably raise and lower rocker arms 132. Because rocker arms 132 are coupled to lift links 118 and thereby to draft links 120, such pivotal raising and lowering of rocker arms 132 correspondingly pivotally raises and lowers draft links 120 on brackets 114, thereby lifting and lowering implements (not shown) mounted on draft links 120. Actuators 124 preferably comprise hydraulic cylinders fluidly coupled to a hydraulic system (not shown) of conventional design, including valving for selectively extending and retracting actuators 124.

FIGS. 6–10 illustrate arm 140 of link 120 in greater detail. FIG. 6 is a left side perspective view of arm 140. FIG. 7 is a right side perspective view of arm 140. FIG. 8 is a top elevational view of arm 140 with portions shown in section for purposes of illustration. FIG. 9 is a side elevational view of arm 140. FIG. 10 is a sectional view of arm 140 taken along lines 10—10 of FIG. 9. As shown by FIGS. 6–10, arm 140 is an elongate member and generally includes ends 142, 144, lift link attachment portion 180, cam follower supporting portion 182 and ribs 184. As best shown by FIG. 8, arm 140 is generally configured such that ends 142 and 144 extend offset and parallel to one another. Because ends 142 and 144 are offset relative to one another, ends 144 diverge from one another and diverge from the transverse center line of work vehicle 112 when ends 142 are connected to brackets 114 to thereby support the implement with greater stability. Because ends 142 and 144 extend substantially parallel to one another, each arm 140 may be interchangeably used on either side of hitch assembly 110. Although less desirable, arm 140 may alternatively be configured such that ends 142 and 144 are generally coplanar or such that ends 142 and 144 do not extend parallel to one another.

Although ends 142 and 144 are substantially identical to one another, end to 142 is specifically adapted for being coupled to work vehicle 112 and, in particular, bracket 114. End 144 is specifically configured for being coupled to an implement (not shown) either directly, or indirectly through use of a coupler. Ends 142 and 144 each include an annular portion 186 about an opening 188 extending from side 190 to side 192 of arm 140. Opening 188 extends about axis 194. Each annular portion 186 of ends 142 and 144 additionally includes socket 150 and passages 196, 198 and indents 200, 202. Socket 150 generally comprises a cavity configured to receive bushing ball 146. As best shown by FIG. 8, socket 150 includes concave semi-spherical surfaces concentrically extending about axis 194 along a circumferential perimeter of opening 188. Although less desirable, socket 150 may merely comprise opposing inner concave surfaces which do not extend completely about axis 194. Socket 150 allows movement of bushing ball 146 about axis 194. In the exemplary boundary, socket 150 additionally enables bushing ball 146 (shown in FIG. 11), to pivot about multiple axes extending through opening 188. At the same time, socket 150 removably retains bushing ball 146 within end 144 and prevents bushing ball 146 from being linearly moved along axis 194 when bushing ball 146 extends about an axis essentially non-perpendicular to axis 194.

Passages 196, 198 facilitate insertion of ball 146 into socket 150 and the removal of ball 146 from socket 150. Passages 196, 198 comprise recesses extending in annular portion 186 on opposite sides of axis 194 and extend from side 190 towards side 192 of arm 140. As shown by FIG. 10, passages 196 and 198 preferably extend half-way between sides 190 and 192 to a mid-point of socket 150. Passages 196 and 198 extend outside the circumferential perimeter of opening 188 and extend through portions of annular member 186 which define the concave surfaces of socket 150. Passages 196 and 198 are preferably configured to receive ball 146 when ball 146 is oriented in a sideways orientation such that the axis 230 about which ball 146 extends lies sideways substantially perpendicular to axis 194. To this end, passages 196 and 198 extend along axis 194 and are generally rectangular in shape. As will be appreciated, the shape of passages 196 and 198 will vary depending upon the exact configuration of ball 146 to be inserted therethrough.

Overall, passages 196, 198 cooperate to enable bushing ball 146 to be partially inserted through opening 188 along axis 194. As will be described in greater detail with respect to FIGS. 11–16 hereafter, bushing ball 146 is then rotated such that socket 150 retains bushing ball 146. Although ends 142 and 144 are illustrated as including passages 196, 198 which extend along axis 194 and which cooperate to enable ball 146 to be removably inserted into socket 150, ends 142 and 144 may alternatively include greater or fewer passages extending along axis 194 or along alternative axes to enable removable insertion of ball 146 into socket 150. As will be appreciated, the exact depth or extent to which passages 196, 198 extend into annular portion 186, in a direction perpendicular to axis 194, will vary depending upon the maximum distance extending between the outer convex surfaces of bushing ball 146.

Indents 200 and 202 comprise recesses which extend through portions of annular portion 186 defining socket 150 on the circumcumferential perimeter of opening 188 on opposite sides of axis 194. Indents 200 and 202 extend from side 192 towards side 190 along axis 194, opposite passages 196 and 198, respectively. Indents 200 and 202 preferably extend along axis 194 to a mid-point between sides 190 and 192 and to a mid-point of socket 150. Indents 200 and 202 are preferably generally triangular in shape with the apex of the triangle terminating proximate to the opposing passage 196, 198. Indents 200, 202 improve the strength of annular portion 186. As will be appreciated, indents 200, 202 may be omitted depending upon the particular application.

Lift link mounting portion 180 extends between ends 142 and 144 proximate to end 144. Lift link mounting portion 180 is configured for being connected to a lift link 118 (shown in FIG. 4). In particular, mounting portion 180 is preferably configured for being pivotally coupled to lift link 118. The exemplary embodiment of mounting portion 180 includes a generally cylindrical opening 210 extending from side 190 to side 192 of arm 140. Opening 210 is specifically sized and configured to receive shaft or pin 137 to form joint 138 (shown in FIG. 4), pivotally connecting arm 140 of draft link 120 to lift link 118. Lift link mounting portion 180 preferably has an increased thickness extending between side 190 to side 192 for increased strength. Although less desirable, lift link mounting portion 180 may alternatively include a weldment welded to arm 140 and providing opening 210.

Cam follower mounting portion 182 is located between ends 142 and 144 so as to support cam follower 148 adjacent to cam 152 during pivoting of draft link 120. Cam follower mounting portion 182 generally includes platform 212, platform 214 and opening 216. Platform 212 and platform 214 extend opposite one another on sides 192 and 190, respectively. Platform 212 and platform 214 extend generally parallel to ends 142 and 144. Platform 212 provides a flat surface oriented so as to support cam follower 148 perpendicularly against cam 152 despite the fact that arm 140 generally extends oblique to the surface of cam 152. Platform 214 provides a stop surface against which the head of fastener 149 (shown in FIG. 4) butts against while holding cam follower 148 upon platform 212. Platform 214 supports fastener 149 perpendicular to the surface of cam 152 (shown in FIG. 4) into fastening relationship with cam follower.

Opening 216 extends through arm 140 from platform 212 to platform 214. Opening 216 receives fastener 149 so that fastener 149 releasably secures cam follower 148 to platform 212 and in engagement with cam 152. Although arm 140 is illustrated as including opening 216 and two opposing platforms 212, 214 for removably supporting cam follower 148, cam follower mounting portion 182 may alternatively be configured to removably support cam follower 148 by various other well-known fastening arrangements. Moreover, in lieu of including cam follower mounting portion 182 to support a distinct cam follower 148, arm 140 may alternatively include a cam follower integrally formed as part of a single unitary body with arm 140.

As best shown by FIG. 7, ribs 184 extend along side 192 generally from lift link mounting portion 180 towards end 142. Ribs 184 strengthen arm 140 along its axial length extending from end 142 to end 144. Although less desirable, ribs 184 may be omitted.

Arm 140 is easy and inexpensive to manufacture relative to conventionally known draft arms. Arm 140 is made using a casting process. In particular, the casting process involves providing a mold, preferably formed from two mold halves forming a cavity having the general shape and configuration of arm 140. In particular, the cavity comprises a negative impression of the general shape and dimensions of arm 140. Because ends 142, 144, lift link mounting portion 180 and cam follower mounting portion 182 have specific shapes and dimensions with critical tolerances, silicon cores are positioned within the mold in the proper locations to facilitate the formation of ends 142, 144, lift link mounting portion 180 and cam follower mounting portion 182. Such cores are configured to have negative impressions of those portions of arm 140 which have critical tolerances. In particular, the core or cores are configured to provide negative impressions of annular portion 186, opening 188, socket 150 and passages 196, 198, 200 and 202 at ends 142 and 144. The core or cores are also configured to include negative impressions of lift link mounting portion 180 including opening 210 and cam follower mounting portion 182 including platforms 212, 214 and opening 216.

Once the outermost cores have been appropriately positioned within the mold, a liquid and preferably molten material having adequate and preferably excellent castability characteristics is deposited into a mold about the core or cores. The molten material preferably comprises ductile iron, also known as nodular iron, which has strong casting characteristics such as good flow characteristics to achieve high tolerances, high degrees of repeatability or consistency and a good finish without surface irregularities. Although having improved castability characteristics for use in forming arm 140, gray iron is viewed as less desirable due its impact strength and wear characteristics.

Once the molten material deposited in the mold about the core or cores has solidified, the resulting arm 140 is removed from the mold and the cores. In the preferred process, the mold is formed from green sand and the cores are formed from pure silica sand with appropriate binding agents in a conventionally known manner. As a result, once the molten material has solidified, the resulting arm 140 is released by removing the mold and the cores from about the solidified material by simply breaking the molding cores apart. After being removed from the mold and cores, arm 140 is then subjected to a heat treatment or austempering process per ASTM standard 897A-90, the full disclosure of which is hereby incorporated by reference, to increase the hardness of arm 140. In particular, arm 140 is treated to a hardness of between about 302 and 363 Brinell Hardness which corresponds to between about 32 and 40 Rockwell C Hardness. As a result, socket 150 and its inner concave surfaces at ends 142 and 144, surfaces about opening 210 of lift link mounting portion 180 and the surfaces forming platforms 212, 214 and extending about opening 216 of cam follower mounting portion 182 also have the resulting hardness of between about 32 and 40 Rockwell C.

In the exemplary embodiment, the ductile iron forming arm 140 has the following characteristics once austempered. Per ASTM standard A897, the austempered ductile iron is Grade Two having a tensile strength of approximately 150,000 psi., a yield strength of approximately 100,000 psi., a 7 percent elongation, an unnotched charpy impact resistance of approximately 60 ft.-lbs., and a Brinell hardness of approximately 302 to 363. Because arm 140 is formed from Grade Two austempered ductile iron, arm 140 is well suited for handling common loads associated with work vehicle 112, preferably a 235 horse power two-wheel drive vehicle. As will be appreciated, other grades of austempered ductile iron as well as other castable materials may be used depending upon the expected loads for the specific vehicle in which arm 140 is employed.

Once arm 140 has been formed, a lift link bushing (not shown) is installed in opening 210 and bushing balls 146 are inserted into sockets 150 at ends 142 and 144 to complete draft link 120. FIGS. 11–16 illustrate bushing ball 146 and its insertion into socket 150 at end 142. The insertion of bushing ball 146 into socket 150 at end 144 is identical. As best shown by FIG. 11, bushing ball 146 is a generally annular member of case hardened low alloy steel having generally flat parallel faces 220, 222, opening 224 and outer convex circumferential surface 226. Faces 220 and 222 extend opposite and parallel to one another and are spaced or separated from one another by an axial width W. Axial width W is sized as to be larger than the width of annular member 186 between sides 190 and 192. Opening 224 extends through bushing ball 146 from face 220 to face 222 along axis 230. At end 142, opening 224 is sized to receive a shaft or pin which is in turn connected to bracket 114 (shown in FIG. 4). At end 144, opening 224 of bushing ball 146 receives pin 168 which is connected to quick coupler 126 (as shown in FIG. 4) or which may alternatively be connected to an implement. As will be appreciated, bushing ball 146 may be omitted in lieu of other structural members which extend from an implement or from quick coupler 126 or are adapted for being connected to an implement or quick coupler 126 and which include a convex surface configured to be pivotally received within socket 150.

Outer circumferential convex surface 226 encircles axis 230 and preferably has a convex curvature substantially equal to the concave curvature of socket 150. However, in contrast to the concave surfaces of socket 150, convex surface 226 has a hardness of between about 57 and about 65 Rockwell C. Outer circumferential convex surface 226 includes opposing portions which are separated from one another by a maximum diameter or distance D. Outer circumferential convex surface 226 faces the concave surface of socket 150 when bushing ball 146 is inserted into socket 150 and when axis 230 is oriented substantially parallel or coincident with axis 194 of socket 150 such that bushing ball 146 is retained within socket 150.

As further shown by FIG. 11, passages 196 and 198 of annular members 186 each have an axial width W' greater than the width W of bushing ball 146. Passages 196 and 198 extend opposite one another so as to provide an opening having a height H greater than the maximum distance D separating opposite portions of convex surface 226 of bushing ball 146. As a result, passages 196 and 198 enable bushing ball 146 to be inserted into socket 150 when axis 230 of bushing ball 146 extends substantially perpendicular to axis 194 of opening 188 by moving bushing ball 146 in the direction indicated by arrow 234 until bushing ball 146 is positioned within opening 188 and socket 150 such that axis 230 extends at a midpoint between sides 190 and 192. Once bushing ball 146 has been inserted partially through opening 188 and socket 150, bushing ball 146 may be simply wroughtated about axis 240 in the clockwise direction shown or in a counterclockwise direction so as to reorient bushing ball 146 such that axis 230 of bushing ball 146 extends parallel, and preferably coincident, with axis 194 of opening 188 as shown in FIGS. 15 and 16. Once oriented in the position shown in FIGS. 15 and 16, bushing ball 146 is captured within socket 150 such that bushing ball 146 cannot be linearly moved along axis 194. At the same time, bushing ball 146 may be pivoted about axes 194, 240 and 244 such that ends 142 and 144 provide universal joints.

Thus, as described above, link 120 may be easily manufactured by casting arm 140 as a single unitary piece and then simply inserting bushing balls 146 into sockets 150. Because arm 140 is cast as a single unitary body, arm 140 may be precisely cast in a desired configuration having the necessary tolerances without the expensive time consuming processes of forging and machining. Because bushing balls 146 are simply inserted into openings 188 and sockets 150 to complete lift link 120, the previously required insert ring is eliminated and swedging is no longer required. In addition to being less time consuming and less costly, the above-described process for forming arm 140 and inserting bushing balls 146 into ends 142 and 144 results in stronger joints at both ends 142 and 144. Because annular members 186 are integral unitary bodies defining the entire sockets 150, sockets 150 at ends 142 and 144 are substantially stronger than the sockets of conventional draft arms wherein the socket is formed from two distinct components affixed to one another such as by swedging. In addition, because bushing balls 146 are removably retained within ends 142 and 144, bushing balls 146 may be easily removed for replacement when worn or damaged.

The resulting manufactured draft link 120 includes sockets 150 having a concave surface with a hardness of between about 32 Rockwell C and about 40 Rockwell C while the outer convex surface 226 of bushing ball 146 has a Rockwell Hardness of between about 57 Rockwell C and about 65 Rockwell C. Conventional wisdom teaches that the resulting link 120 having a cast arm 140 would be undesirable since the entire socket surface of the draft arm contacting the convex surface of the bushing ball has a relatively low hardness generally insufficient to deter abrasive wear. However, in direct contrast to this conventional wisdom, it has been discovered that the major mechanism which wears sockets 150 and bushing ball 146 is not abrasive wear, but is in fact adhesive wear. As a result, despite having only a hardness of between about 32 Rockwell C and about 40 Rockwell C, draft link 120 adequately resists wear. In fact, austempering the ductile iron per ASTM standard A897 creates a surface for sockets 150 which includes an ausferrite matrix and graphite nodules. The ausferrite matrix and the graphite nodules along the surface of sockets 150 have superior adhesive wear resistance.

In summary, draft link 120 is easily and inexpensively manufactured and is easily and inexpensively serviced. Because it has been discovered that the major wear mechanism causing deterioration of draft link 120 and bushing ball 146 is actually adhesive wear and not abrasive wear, those requirements previously deemed necessary by conventional wisdom no longer must be satisfied. In particular, instead of relying upon a high material hardness of the socket itself, which has previously necessitated the use of forged heat treated steel to prevent abrasive wear, socket 150 may be formed from a softer material, thereby permitting socket 150 to be formed using a casting process, which is easier and less expensive. Moreover, the much harder insert rings 20, 22 are no longer necessary to provide a hardened surface of approximately 55–65 Rockwell C to prevent abrasive wear. Because sockets 150 removably retain bushing ball 146, draft link 120 is easily assembled by simply inserting bushing balls 146 into sockets 150. As a result, additional parts, such as insert rings, and additional steps, such as swedging, are eliminated. In addition, the structural integrity and strength of sockets 150 are improved as compared to conventional assemblies where the insert ring is swedged or otherwise affixed to the ends of the draft arm to capture the bushing balls within the sockets. Moreover, because sockets 150 removably retain bushing balls 146, bushing balls 146 are easily removed from sockets 150 for inspection of both bushing balls 146 and sockets 150, as well as for replacement of bushing balls 146.

Although ends 142 and 144 including sockets 150 and passages 196, 198 have been illustrated as part of arm 140 of lower link 120, ends 142 and 144, including such elements as annular member 186, opening 188, socket 150 and passages 196, 198 may alternatively or additionally be utilized at opposite ends of upper link 122.

Each of the above advantageous features work in harmony, such that draft link 120 is easily and inexpensively manufactured and is easily and inexpensively serviced and maintained. Although less desirable, many of the advantageous features of draft link 120 may be independently incorporated into alternative link designs. For example, although ends 142 and 144, including sockets 150, are illustrated as being cast as part of a single unitary body with the remainder of arm 140, ends 142 and 144 may be independently cast and then affixed to one or more portions of arm 140 extending between ends 142 and 144. Although passages 196, 198 enabling removable insertion of bushing ball 146 into socket 150, are illustrated as being formed in a single unitary cast of annular member 186, passages 196, 198 may alternatively be provided by one or more alternative distinct components or members which are fastened, bonded, or otherwise affixed to one another and may alternatively be formed by other processes such as forging. Although passages 196, 198 have been described and illustrated as part of a draft arm in conjunction with socket 150 having a relatively soft concave surface, passages 196, 198 or variations thereof, may be utilized with sockets having conventional higher hardnesses. Similarly, the soft concave surfaces of socket 150 may be alternatively utilized in conventional sockets where the ball is not removably retained within the socket.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements. This invention is not limited to the methods of implementation that have been explicitly described, but it includes the various variants and generalizations contained in the following claims.

What is claimed is:

1. A link for a hitch of a work vehicle, the link comprising:
at least one elongate member having a first end adapted for being coupled to the work vehicle and a second end adapted for being coupled to an implement, at least one of the first and the second ends including:
a socket integrally formed as a single unitary body wherein the socket includes at least one passage; and
a ball rotatable within the socket, wherein the ball is removably retained within the socket, wherein the socket has a first surface formed from a metal having an ausferrite matrix and graphite spheroids and wherein the ball has a second surface facing the first surface, whereby the metal of the first surface resists adhesive wear of the socket from contact with the ball.

2. The link of claim 1 wherein the socket has a first opening therethrough about a first axis, wherein the ball has a second opening therethrough about a second axis and wherein said at least one passage is configured to receive the ball only when the second axis of the ball is non-coincident with the first axis of the socket.

3. The link of claim 1 wherein the socket has a first opening therethrough about a first axis, wherein the ball has a second opening therethrough about a second axis and wherein the passage is configured to receive the ball only when the second axis of the ball extends nonparallel to the first axis of the socket.

4. The link of claim 3 wherein the passage is configured to receive the ball only when the second axis of the ball extends substantially perpendicular to the first axis of the socket.

5. The link of claim 3 wherein the ball is removably retained within the socket when the second axis of the ball extends substantially non-perpendicular to the first axis of the socket.

6. The link of claim 1 wherein the socket includes:
an annular member having an opening therethrough extending about an axis, first and second opposing inner concave surfaces about the axis and at least one passage extending through at least one of the first and second concave surfaces in a direction along the axis; and
wherein the ball is configured to be coupled to the implement and includes first and second convex surfaces adjacent to the first and second inner concave surfaces.

7. The link of claim 6 wherein the ball has a first axial width, wherein the first and second opposing convex surfaces are separated by a maximum first distance, wherein the at least one passage has a second width greater than the first width and wherein the at least one passage has a height greater than the maximum distance separating the first and second convex surfaces of the ball.

8. The link of claim 1 wherein the first surface is concave and wherein the second surface is convex.

9. The link of claim 8 wherein the first surface has a first hardness between about 32 and about 40 Rockwell C and wherein the second surface has a second hardness of the second surface is between about 57 and about 65 Rockwell C.

10. The link of claim 1 wherein the first surface has a hardness less than about 40 Rockwell C.

11. The link of claim 1 wherein the elongate member has first and second opposing symmetrical ends.

12. A link for a hitch of a work vehicle, the link comprising:
an elongate arm having a first end adapted for being coupled to the work vehicle and a second end adapted for being coupled to an implement, at least one of the first and second ends including:
a socket having a first surface formed from a metal having an ausferrite matrix and graphite spheroids; and
a ball received within the socket, the ball having a second surface facing the first surface, whereby the metal of the first surface resists adhesive wear of the socket from contact with the ball.

13. The link of claim 12 wherein the first surface is concave and wherein the second surface is convex.

14. The link of claim 12 wherein the first surface has a hardness less than about 40 Rockwell C.

15. The link of claim 12 wherein the first surface has a first hardness between about 32 and about 40 Rockwell C and wherein the second surface has a second hardness of the second surface is between about 57 and about 65 Rockwell C.

16. The link of claim 12 wherein the ball is removably retained within the socket.

17. An arm for use with a ball having a first surface to form a link of a work vehicle hitch, the arm comprising:
an elongate member having a first end adapted for being coupled to the work vehicle and a second end adapted for being coupled to an implement, at least one of the first and second ends including a socket, the socket having a second surface adapted to face the first surface of the ball when the ball is received within the socket, the second surface being formed from a metal having an ausferrite matrix and graphite, whereby the metal resists adhesive wear of the socket from contact with the ball.

18. The arm of claim 17 wherein the socket is configured to removably retain the ball therewithin.

19. A link for a hitch of a work vehicle, the link comprising:
at least one elongate member having a first end adapted for being coupled to the work vehicle and a second end adapted for being coupled to an implement, wherein the first end and the second end are symmetrical and extend in parallel non-coincident planes, at least one of the first and the second ends including:
a socket integrally formed as a single unitary body wherein the socket includes at least one passage; and
a ball rotatable within the socket, wherein the ball is removably retained within the socket wherein the socket has a first surface formed from a metal having an ausferrite matrix and graphite spheroids and wherein the ball has a second surface facing the first surface, whereby the metal of the first surface resists adhesive wear of the socket from contact with the ball.

20. The link of claim 19 wherein the socket has a first opening therethrough about a first axis, wherein the ball has a second opening therethrough about a second axis and wherein said at least one passage is configured to receive the ball only when the second axis of the ball is non-coincident with the first axis of the socket.

21. The link of claim 19 wherein the socket has a first opening therethrough about a first axis, wherein the ball has a second opening therethrough about a second axis and wherein the passage is configured to receive the ball only when the second axis of the ball extends nonparallel to the first axis of the socket.

22. The link of claim 21 wherein the passage is configured to receive the ball only when the second axis of the ball extends substantially perpendicular to the first axis of the socket.

23. The link of claim 19 wherein the ball is removably retained within the socket when the second axis of the ball extends substantially non-perpendicular to the first axis of the socket.

24. The link of claim 19 wherein the socket includes:
an annular member having an opening therethrough extending about an axis, first and second opposing inner concave surfaces about the axis and at least one passage extending through at least one of the first and second concave surfaces in a direction along the axis; and
wherein the ball is configured to be coupled to the implement and includes first and second convex surfaces adjacent to the first and second inner concave surfaces.

25. The link of claim 19 wherein the ball has a first axial width, wherein the first and second opposing convex surfaces are separated by a maximum first distance, wherein the at least one passage has a second width greater than the first width and wherein the at least one passage has a height greater than the maximum distance separating the first and second convex surfaces of the ball.

26. The link of claim 19 wherein the first surface has a hardness less than about 40 Rockwell C.

27. The link of claim 26 wherein the first surface has a first hardness between about 32 and about 40 Rockwell C and wherein the second surface has a second hardness of the second surface is between about 57 and about 65 Rockwell C.

* * * * *